(12) United States Patent
Detlefs et al.

(10) Patent No.: US 7,599,973 B2
(45) Date of Patent: Oct. 6, 2009

(54) METHOD AND APPARATUS FOR DECREASING OBJECT COPYING BY A GENERATIONAL, COPYING GARBAGE COLLECTOR

(75) Inventors: David L. Detlefs, Westford, MA (US); Antonios Printezis, Burlington, MA (US); Steven K. Heller, Acton, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 354 days.

(21) Appl. No.: 11/331,376

(22) Filed: Jan. 12, 2006

(65) Prior Publication Data

US 2007/0174370 A1 Jul. 26, 2007

(51) Int. Cl.
*G06F 12/00* (2006.01)
(52) U.S. Cl. .................................................. 707/206
(58) Field of Classification Search ............... 707/206
See application file for complete search history.

(56) References Cited

U.S. PATENT DOCUMENTS

| | | | | |
|---|---|---|---|---|
| 5,842,016 | A * | 11/1998 | Toutonghi et al. | 718/106 |
| 6,148,310 | A * | 11/2000 | Azagury et al. | 707/206 |
| 6,173,294 | B1 * | 1/2001 | Azagury et al. | 707/206 |
| 6,272,612 | B1 * | 8/2001 | Bordaz et al. | 711/203 |
| 6,308,185 | B1 * | 10/2001 | Grarup et al. | 707/206 |
| 6,317,756 | B1 * | 11/2001 | Kolodner et al. | 707/206 |
| 6,317,816 | B1 * | 11/2001 | Loen | 711/171 |
| 6,363,403 | B1 * | 3/2002 | Roy et al. | 707/206 |
| 6,381,738 | B1 * | 4/2002 | Choi et al. | 717/140 |
| 6,446,257 | B1 * | 9/2002 | Pradhan et al. | 717/154 |
| 6,457,023 | B1 * | 9/2002 | Pinter et al. | 707/206 |
| 6,490,599 | B2 * | 12/2002 | Kolodner et al. | 707/206 |
| 6,493,730 | B1 * | 12/2002 | Lewis et al. | 707/206 |
| 6,505,344 | B1 * | 1/2003 | Blais et al. | 717/151 |
| 6,681,306 | B1 * | 1/2004 | Kessler et al. | 711/171 |
| 6,732,293 | B1 * | 5/2004 | Schneider | 714/15 |
| 6,769,004 | B2 * | 7/2004 | Barrett | 707/206 |
| 6,799,191 | B2 * | 9/2004 | Agesen et al. | 707/206 |
| 6,823,351 | B1 * | 11/2004 | Flood et al. | 707/206 |
| 6,826,583 | B1 * | 11/2004 | Flood et al. | 707/206 |
| 6,868,488 | B2 * | 3/2005 | Garthwaite | 711/173 |
| 6,928,460 | B2 * | 8/2005 | Nagarajan et al. | 707/206 |
| 7,114,045 | B1 * | 9/2006 | Pliss et al. | 711/159 |
| 2001/0000821 | A1 * | 5/2001 | Kolodner et al. | 711/170 |
| 2001/0044856 | A1 * | 11/2001 | Agesen et al. | 709/315 |

(Continued)

OTHER PUBLICATIONS

Zaman, W.U.; Ahmad, S.A.; Abbas, A.; Qadeer, A.; A novel design of a generational garbage collector, Aug. 2002, Students Conference, ISCON '02. Proceedings. IEEE.*

(Continued)

*Primary Examiner*—Charles Rones
*Assistant Examiner*—Kurt Mueller
(74) *Attorney, Agent, or Firm*—Osha • Liang LLP

(57) ABSTRACT

In a generational, copying garbage collector, young generation collection may be made more efficient by dynamically measuring object survival rates as a function of "fine-grained" allocation age, and choosing, on the basis of these survival rates, part of the young generation that will be not be collected, but instead scanned for pointers to objects in the rest of the young generation. The rest of the young generation, including objects referenced by the pointers, is then collected.

12 Claims, 6 Drawing Sheets

U.S. PATENT DOCUMENTS

| | | | |
|---|---|---|---|
| 2002/0019716 A1* | 2/2002 | Agesen et al. | 702/83 |
| 2002/0095453 A1* | 7/2002 | Steensgaard | 709/107 |
| 2002/0129343 A1* | 9/2002 | Pinter et al. | 717/140 |
| 2002/0161792 A1* | 10/2002 | Garthwaite | 707/206 |
| 2003/0033498 A1* | 2/2003 | Borman et al. | 711/206 |
| 2003/0126352 A1* | 7/2003 | Barrett | 711/100 |
| 2003/0212719 A1* | 11/2003 | Yasuda et al. | 707/206 |
| 2004/0088277 A1* | 5/2004 | Garthwaite | 707/1 |
| 2004/0088337 A1* | 5/2004 | Garthwaite | 707/206 |
| 2004/0088339 A1* | 5/2004 | Garthwaite | 707/206 |
| 2004/0103126 A1* | 5/2004 | Garthwaite | 707/206 |
| 2004/0111448 A1* | 6/2004 | Garthwaite | 707/206 |
| 2004/0122875 A1* | 6/2004 | Garthwaite | 707/206 |
| 2004/0162860 A1* | 8/2004 | Detlefs | 707/206 |
| 2004/0172428 A1* | 9/2004 | Garthwaite | 707/206 |
| 2005/0273568 A1* | 12/2005 | Blandy | 711/170 |
| 2007/0100919 A1* | 5/2007 | Lee et al. | 707/206 |
| 2008/0250088 A1* | 10/2008 | Printezis et al. | 707/206 |

OTHER PUBLICATIONS

Srisa-an, W.; Chang, J.M.; Chia-Tien Dan Lo; Do generational schemes improve the garbage collection efficiency?, Apr. 2000, Performance Analysis of Systems and Software, 2000. ISPASS. 2000 IEEE.*

Pretenuring for Java (2001), Stephen M. Blackburn, Sharad Singhai, Matthew Hertz, Kathryn S. Mckinley, J. Eliot, B. Moss In Proceedings of SIGPLAN 2001 Conference on Object-Oriented Programming, Languages, & Applications http://www-ali.cs.umass.edu/~hertz/pretenure-oopsla-2001.pdf.*

Richard Jones and Rafael Lins, Garbage Collection : Algorithms for Automatic Dynamic Memory Management, 1996, pp. 143-181 (chapter 7).*

Ungar, David., Generation Scavenging: A Non-disruptive High Performance Storage Reclamation Algorithm, 1984. pp. 157-167, USA.

Detlefs, David, Flood, Christine, Heller, Steve, & Printezis Tony, Garbage-First Garbage Collection, 2004, pp. 1-12. Vancouver, British Columbia, Canada.

Harris, Timothy L., Dynamic adaptive pre-tenuring, Proceedings of the international Symposium on Memory Management, 2000, pp. 1-10, USA.

Gottry, Ken, Pick up performance with generational garbage collection, www.javaworld.com/javaworld/jw-0102002/jw-0111-hotspotgc_p.html, 2002, pp. 1-14.

* cited by examiner

METHOD AND APPARATUS FOR DECREASING OBJECT COPYING BY A GENERATIONAL, COPYING GARBAGE COLLECTOR

BACKGROUND

This invention relates to automatic reclamation of allocated, but unused memory, or garbage, in a computer system that uses a generational garbage collector and, particularly, to techniques for reducing object copying during garbage collection cycles. Memory reclamation may be carried out by a special-purpose garbage collection algorithm that locates and reclaims memory that is unused, but has not been explicitly de-allocated. There are many known garbage collection algorithms which reclaim memory allocated to objects by object-oriented programs, including reference counting, mark-sweep, mark-compact and generational garbage collection algorithms. These, and other garbage collection techniques, are described in detail in a book entitled "Garbage Collection, Algorithms for Automatic Dynamic Memory Management" by Richard Jones and Raphael Lins, John Wiley & Sons, 1996.

However, many of the aforementioned garbage collection techniques often lead to long and unpredictable delays because normal processing must be suspended during the garbage collection process and these collectors at least occasionally scan the entire heap. The garbage collection process is performed by collection threads that perform collection work when all other threads are stopped. Therefore, these techniques are generally not suitable in situations, such as real-time or interactive systems, where non-disruptive behavior is of greatest importance.

Conventional generational collection techniques alleviate these delays somewhat by concentrating collection efforts on a small memory area, called the "young" generation, in which most of the object allocation activity occurs. Generational garbage collection has been a very successful strategy. It relies on an empirical observation that has been found to be true of many programs: that recently allocated objects are more likely to become unreachable than older objects that have already survived several garbage collection cycles. Dividing up a garbage-collected heap into a young and an old generation allows a copying garbage collection technique to be used for collection of the young generation, where survival rates are fairly low, and a garbage collection technique more appropriate to higher occupancies, such as mark-sweep-compact, to be used for collection of the old generation.

SUMMARY OF THE INVENTION

In accordance with the principles of the invention, young generation collection may be made more efficient by dynamically measuring object survival rates as a function of "fine-grained" allocation age, and choosing, on the basis of these survival rates, part of the young generation that will be not be collected, but instead scanned for pointers to objects in the rest of the young generation. The rest of the young generation, including objects referenced by the pointers, is then collected.

In one embodiment, all objects in the young generation part that will not be collected are assumed to be reachable and are scanned for pointers to objects in the rest of the young generation.

In another embodiment, root objects are scanned to locate reachable objects and only the reachable objects are scanned for pointers to objects in the rest of the young generation.

In still another embodiment, object survival rates are measured during the collection of the rest of the young generation by counting the number of bytes copied.

In yet another embodiment, the size of the part of the young generation that will be not be collected is determined after each collection cycle by calculating the garbage collection efficiency for a range of sizes and then selecting the size that produces the highest garbage collection efficiency.

In still another embodiment, conventional techniques are used to segregate object allocations into those likely to produce very short-lived objects, and those likely to produce objects with longer lifetimes. The principles of the invention are applied preferentially to the object allocations that produce objects with longer lifetimes, thus increasing their effectiveness.

BRIEF DESCRIPTION OF THE DRAWINGS

The above and further advantages of the invention may be better understood by referring to the following description in conjunction with the accompanying drawings in which.

DETAILED DESCRIPTION

In the discussion below, a particular garbage collector known as the "Garbage-First" garbage collector is used as an example of a generational, copying garbage collector. However, those skilled in the art would realize that the principles of the invention apply to other similar generational, copying collectors. The Garbage-First garbage collector is described in general in "Garbage-First Garbage Collection", D. Detlefs, C. Flood, S. Heller and A. Printezis, *Proceedings of the 4th International Symposium on Memory Management*, pp. 37-48, Vancouver, BC, Canada 2004 and in greater detail in U.S. patent application Ser. No. 10/985,447, filed on Nov. 11, 2004 by D. Detlefs, S. Heller and A. Garthwaite and assigned to the same assignee as the present invention, both documents are incorporated in their entirety by reference herein.

It is a common practice in garbage-collection literature to measure time in units of "bytes of program allocation." Program allocation refers to memory space that is allocated when a program (called a "mutator") reserves heap memory, for example, for instantiating an object. If the program allocates space at a fairly constant rate, the number of bytes of program allocation will be roughly proportional to actual elapsed time. As described in the aforementioned article and patent application, in the Garbage-First garbage collector, heap memory is divided into equal-sized "regions", each having a default size of 1 MB. The mutator program allocates a new region when necessary, then allocates space within that region for instantiating objects until the region free space is exhausted. Then a new region is allocated and so on. Each region, therefore, contains a range of objects whose age of allocation, measured in bytes allocated, falls into a 1 MB range. When the aforementioned Garbage-First garbage collector is used as a generational collector, it collects the N most recently-allocated regions which are collectively called the "young generation".

Figure 1:
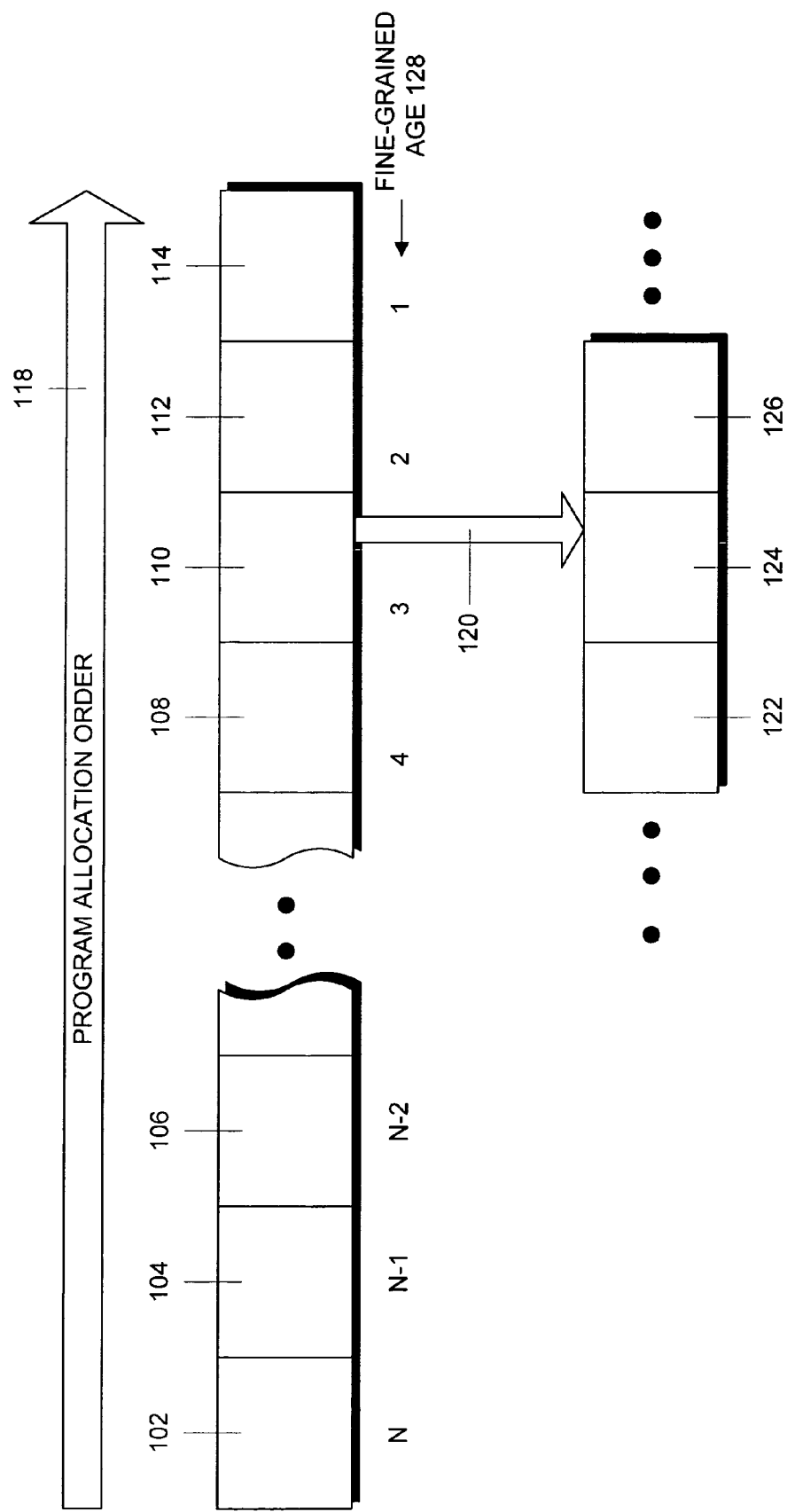
FIG. 1 is a block schematic diagram that illustrates object allocation in a plurality of heap memory regions in accordance with a mutator program operating in a conventional fashion with a Garbage First garbage collector.

This arrangement is schematically shown in FIG. 1 which illustrates a young generation 100 which has been divided into N 1 MB regions, of which regions 102-114 are shown. The order of these regions as shown in FIG. 1 could be physical, indicating that the regions are contiguous in memory, or logical, in which case the regions may or may not be contiguous in memory. In FIG. 1, the application program allocates in the order shown by arrow 118. In particular, region 102 is allocated first and objects are allocated within that region. Next, region 104 is allocated and objects are then allocated within that region. This continues with the youngest region always being the region farthest on the right. Therefore, region 114 is the youngest region illustrated in FIG. 1.

Each region 102-114 has a "fine-grained" allocation age 128 that increases from right to left. The youngest region 114 has a fine-grained allocation age of 1 MB, while the oldest region has a fine-grained allocation age of N MB. Each region also defines a range of object allocation ages. The most-recently-allocated region 114 defines objects in the allocation age range from 0 to 1 MB, the next-most-recently-allocated region 112 defines objects in the allocation age range 1 MB to 2 MB, and so on.

In general, the youngest region will have the most live objects, the next youngest region slightly less and so on.

During collection, the collector evacuates live objects from each region into other regions by copying the objects from the set of regions being collected into another set of regions (illustratively shown as regions 122-126 in FIG. 1) and deciding which region to credit as having extra surviving bytes. This is shown in FIG. 1, which illustrates the collection of regions 108, 110 and 112 by copying live objects in those region to other regions 122, 124 and 126 as schematically indicated by arrow 120 . In accordance with the principles of the invention, during this process, the collector is modified to count the bytes of surviving objects copied out from the region being collected in order to determine the number of surviving bytes and, from these, measure the percentage of bytes that survive collection (the survival rate). Each young region is then associated with its survival rate.

Figure 2:
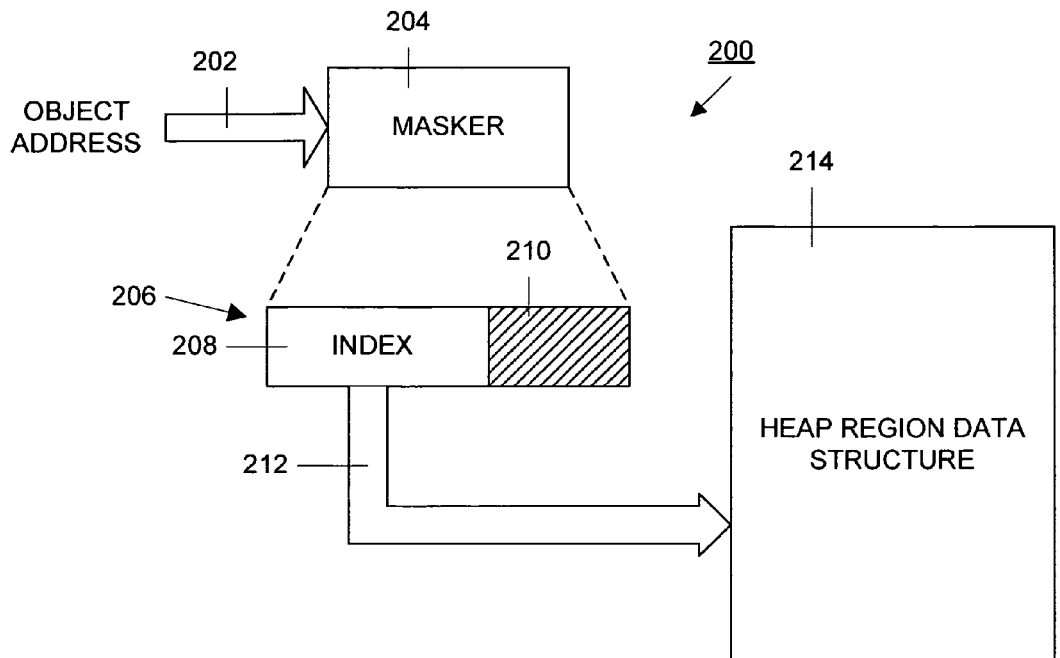
FIG. 2 is a block schematic diagram of an illustrative mechanism for determining byte survival rates for selected heap regions.

The byte counting can be performed by a mechanism such as the mechanism 200 illustrated in FIG. 2. As each object is copied during the collection copying process, its address is applied to a masker 204 as schematically illustrated by arrow 202 .The masker 204 subtracts the address of the first region and then masks off the lower bits 210 of the address 206, leaving the upper bits (for example, in a 1 MB region, the lower twenty bits would be masked off leaving the upper twelve bits) as an offset which can be used to index into a heap region data structure 214 and identify the young generation region from which the bytes associated with that object came. This arrangement allows the collector to credit the copied bytes to the appropriate young generation region.

Figure 3:
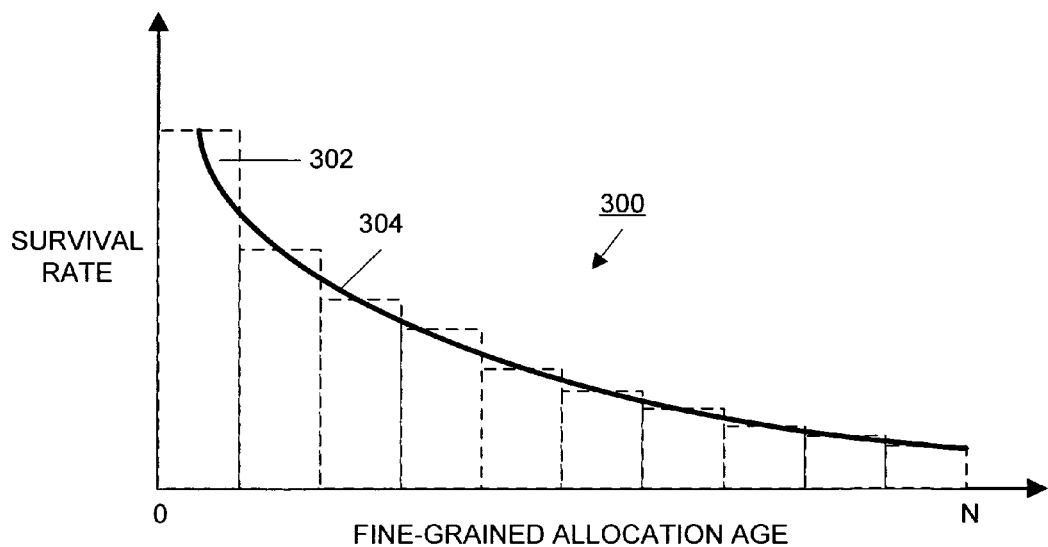
FIG. 3 is a graph illustrating the general shape of a plot of byte survival rate versus fine-grained allocation age.

The object survival rate can be displayed as a graph 300 as a function of object allocation age as illustrated in FIG. 3. In this graph, the vertical axis is the object survival rate increasing in the upwards direction and the horizontal axis is the fine-grained allocation age increasing to the right. Each block, such as block 302, represents the object survival rate for the region with the fine-grained age as shown. It should be noted that once objects are destroyed, they do not reappear. Thus, as allocation age increases, the number of live objects in a given region never increases and usually decreases. Accordingly, the graph 300 usually displays a monotonically decreasing shape 304: if a program allocates objects with similar lifetime characteristics in each 1 MB region, then older regions will have lower survival rates than younger ones. In accordance with the principles of the invention, it has been determined that there is a characteristic object lifetime associated with many programs as evidenced by a fine-grained allocation age after which many objects are destroyed. For example, with the SPECjbb benchmark program used to test programs written in the Java™ programming language and using the aforementioned Garbage First garbage collector, it has been observed that, when running with eight "warehouses", or user threads, object survival rates decline dramatically and abruptly from 40-50% down to less than 5% after a fine-grained allocation age of 50 MB.

Figure 4:
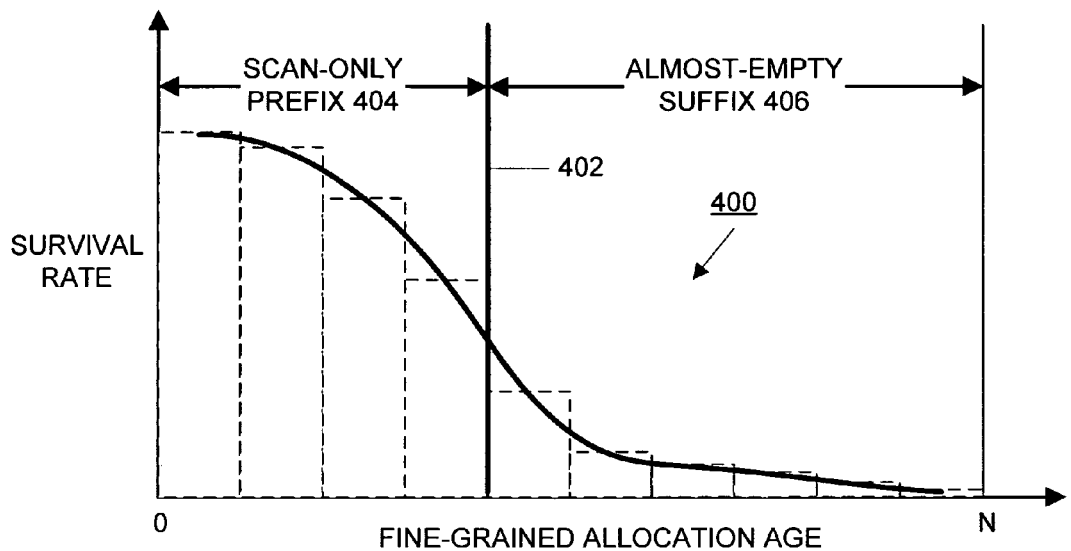
FIG. 4 is a graph illustrating the byte survival rate as a function of fine-grained allocation age for certain programs that exhibit a sharp dropoff in object survival rate as a function of allocation age.

For these latter programs, the graph shown in FIG. 3 takes the shape of the graph 400 shown in FIG. 4. In such programs, a boundary 402 can be identified between more-recently-allocated "partially-occupied" regions and less-recently-allocated "almost-empty" regions. The almost-empty regions contribute little to the cost of collection and, if sufficient space is available, collecting incremental regions beyond this boundary adds relatively little to the overall cost of the young-generation collection. The partially-occupied regions contribute to the cost of the collection in several ways, including the cost of copying live objects, the cost of scanning live objects for pointers to other objects, and the cost of adding pointers to remembered sets (in space-incremental collectors, such as the Garbage-First collector, that require remembered set maintenance).

Figure 5:
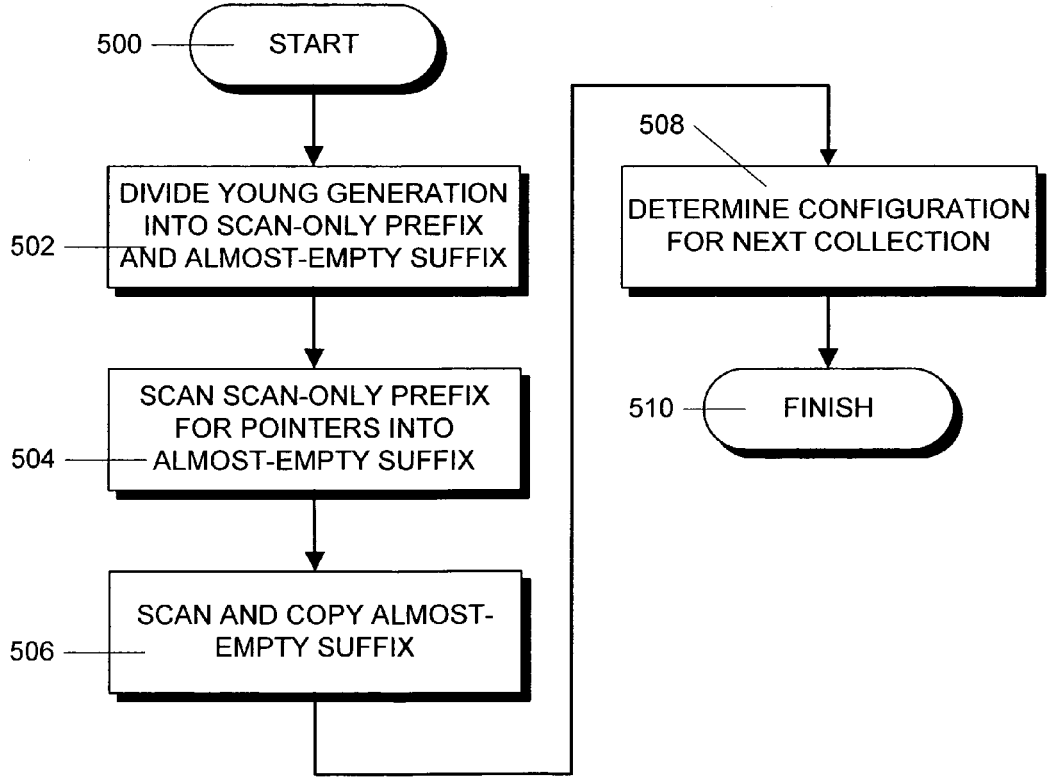
FIG. 5 is a flowchart showing the steps in an illustrative process for performing a collection of the young generation in accordance with the principles of the invention in which the young generation is divided into a scan-only prefix and an almost-empty suffix.
Figure 6:
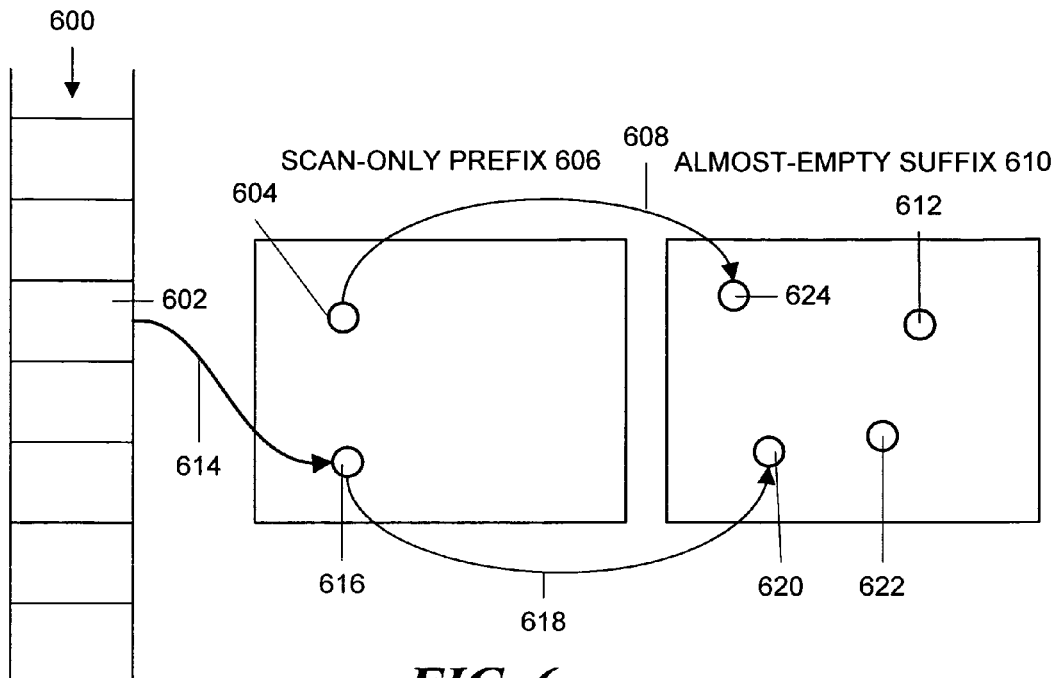
FIG. 6 is a block schematic diagram illustrating one embodiment in which root objects are examined to locate reachable objects in the scan-only prefix.

In accordance with the principles of the invention, all costs except the cost of scanning live objects for pointers can be eliminated by treating the partially-occupied regions as a "scan-only prefix." Regions in this scan-only prefix are not collected. Instead, the regions are scanned for objects that have pointers into the remainder of the young generation (that is, the almost-empty suffix). Live objects thus identified in the almost-empty suffix are evacuated and scanned for pointers to other objects in the almost-empty suffix, which, if not already identified, are evacuated and scanned in turn. This process is shown in FIG. 5 which begins in step 500 and proceeds to step 502 where the young generation is divided into a scan-only prefix and a an almost-empty suffix. In step 504, the scan-only prefix is scanned to locate pointers into the almost-empty suffix. Next, in step 506, the almost-empty suffix is scanned and the live objects and those which are referenced by pointers from the scan-only prefix are copied. Then, in step 508, a new "configuration" including the division between the scan-only prefix and the almost-empty suffix is determined for the next collection cycle. The determination of this new configuration is discussed in detail below. The process then finishes in step 510.

In accordance with the principles of the invention, all costs except the cost of scanning live objects for pointers can be eliminated by treating the partially-occupied regions as a "scan-only prefix." Regions in this scan-only prefix are not collected. Instead, the regions are scanned for objects that have pointers into the remainder of the young generation (that is, the almost-empty suffix). Live objects thus identified in the almost-empty suffix are evacuated and scanned for pointers to other objects in the almost-empty suffix, which, if not already identified, are evacuated and scanned in turn. This process is shown in FIG. 5 which begins in step 500 and proceeds to step 502 where the young generation is divided into a scan-only prefix and a an almost-empty suffix. In step 504, the scan-only prefix is scanned to locate pointers into the almost-empty suffix. Next, in step 506, the almost-empty suffix is scanned and the live objects and those which are referenced by pointers from the scan-only prefix are copied. Then, in step 508, a new "configuration" including the division between the scan-only prefix and the almost-empty suffix is determined for the next collection cycle. The determination of this new configuration is discussed in detail below. The process then finishes in step 510.

Figure 7:
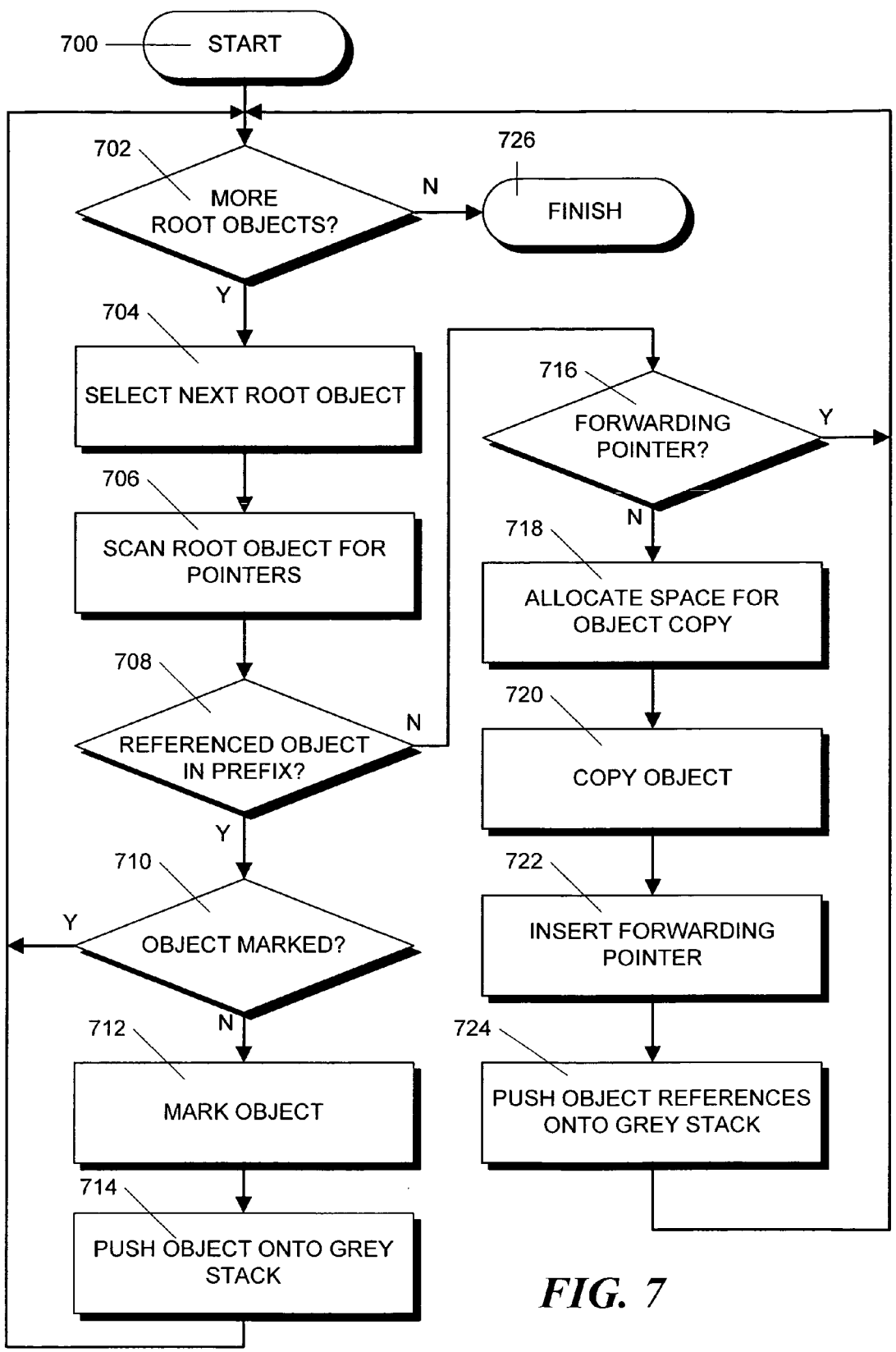
FIG. 7 is a flowchart showing the steps in an illustrative process for locating, marking and copying reachable objects.

In the marking and copying process, the collector follows pointers from root objects and processes objects that are reachable. As shown in FIG. 7, the process starts in step 700 and proceeds to step 702 where a determination is made whether additional root objects remain to be processed. For example, the collector may examine the stack 600 for root objects, such as object 602. If more root objects remain to be processed, then in step 704, the next root object to be processed is selected and the collector then scans that object (in step 706) and follows pointers therein, such as a pointer illustrated by arrow 614, to objects. Once an object has been determined to be reachable, it is processed further. In step 708, a determination is made whether the reachable object is in the scan-only prefix 606, such as object 616. If so, in step 710, a determination is made whether the object has already been marked. If the object has already been marked, then the process returns to step 702 to determine whether additional root objects remain to be processed.

Alternatively, if in step 710, it is determined that the object has not already been marked, the process proceeds to step 712 where the object is marked. In step 714, the marked object is pushed onto the grey stack so that it can be scanned for pointers during further processing. The process then returns to step 702 to determine whether further root objects need to be processed.

If a determination is made in step 708 that the reachable object is not in the scan-only prefix, then the object must be copied. In particular, the process proceeds to step 716 where a determination is made whether a forwarding pointer has been inserted into the object, indicating that the object has already been copied. If so, the process proceeds back to step 702 to determine whether further root objects remain to be processed.

Alternatively, if in step 716 a determination is made that no forwarding pointer exists, then, in step 718, memory space is allocated for a copy of the object being processed. In step 720, the object is copied to the allocated space and, in step 722, a forwarding pointer is inserted into the original object that points to the new copy. Then, in step 724, the references that the object contains are pushed onto the grey stack during further processing.

Operation continues in this manner until all root objects have been examined as determined in step 702. Then, the process finishes in step 726. Thereafter the objects that have been pushed onto the grey stack are processed in a conventional fashion, for example by using a sub-routine comprising steps 706-724, or equivalents, for each object on the grey stack. Other embodiments may alternate between root object and grey-stack processing according to various heuristics. During this process, pointers are followed from objects in the scan-only prefix 606 to objects in the almost-empty suffix 610 and these latter objects are copied and pushed onto the grey stack. If all objects in the scan-only prefix regions are treated as "live", then pointers 608 and 618 from objects 604 and 616 will be followed to objects 624 and 620, respectively. In the alternative implementation, in which only pointers in marked objects in the scan-only prefix are scanned, pointer 608 will not be followed, since no path from the roots to it will cause it to be marked. Other objects 612 and 622 may also be copied or reclaimed.

In either of the latter embodiments, the scan-only prefix regions are not collected because objects in them are not likely to be garbage. Instead, these objects are retained and allowed more time to become garbage. Those objects that do not become garbage by the next collection cycle become the oldest part of the next young generation. If the size of the young generation is sufficiently larger than the size of the scan-only prefix, then objects in the current scan-only prefix will be sufficiently old by the next collection to be part of the almost-empty suffix of the next collection.

At the end of each collection cycle, a "configuration," is chosen for the next collection as set forth in step 508 shown in FIG. 5. This configuration may include the number of regions to be collected and includes the number of regions that will be treated as part of the scan-only prefix. The number of regions to be collected is determined by the garbage collection algorithm used to perform the collection. For example, for the aforementioned Garbage First garbage collector, the number of regions to be collected is approximately equal to as many young-generation regions as will fit in an available pause time. However, in practice, the number of regions to be collected may be limited by the availability of sufficient additional "to-space" required to copy a fairly conservative estimate of the surviving bytes.

The configuration can then be optimized by selecting the number of regions in the scan-only prefix using several measured parameters, including dynamic direct measurements of survival rates as a function of region fine-grained allocation age for regions within the young generation and similar direct measurements of the cost of copying a live object byte and the cost of scanning a scan-only prefix region.

In one embodiment, this optimization is performed by calculating a garbage collection efficiency for a range of scan-only prefix sizes and then selecting the scan-only prefix size that produces the maximum efficiency. For each scan-only prefix size in the range, the cost of scanning each region in a scan-only prefix of that size is calculated, and then the cost of collecting each of the young-generation regions in the remaining almost-empty suffix is calculated. In order to calculate this latter cost, the number of bytes that will be copied (and thus the number of bytes that will be collected) can be estimated from the survival rate measurements discussed above, and the cost of that copying can be approximated by multiplying the estimated number of bytes copied by the measured cost per byte of copying objects. This calculation gives the garbage collection efficiency as:

$$GC_{eff} = \frac{\text{bytes collected}}{\text{cost of copying}}$$

Figure 8:
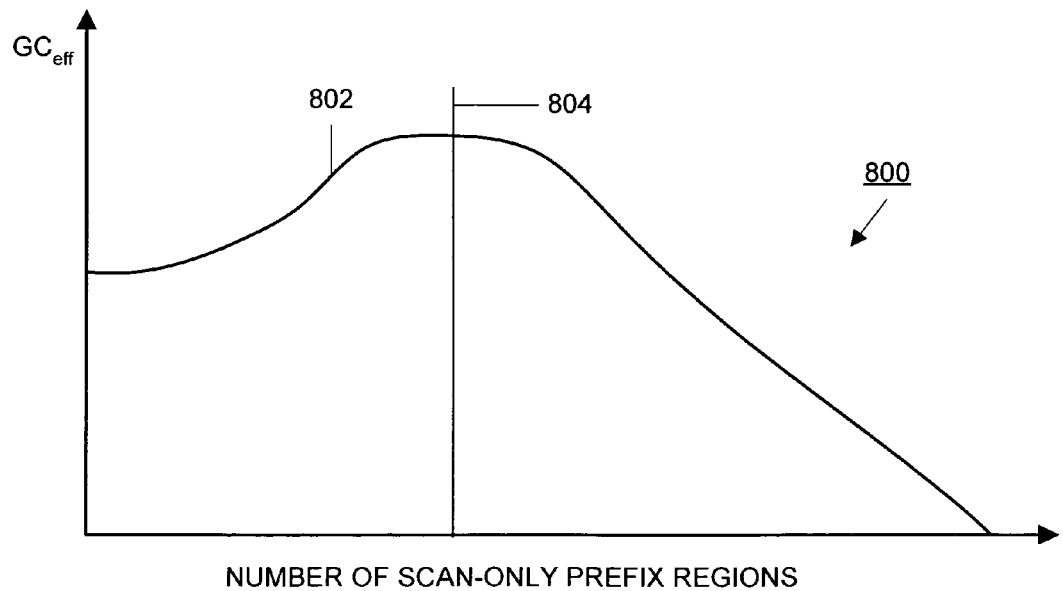
FIG. 8 is a plot of garbage collection efficiency versus the number of regions in the scan-only prefix that is used to select the optimum size of the scan-only prefix.

The garbage collection efficiency can be calculated for each potential scan-only prefix size. When the garbage collection efficiency is plotted against the number of regions in the scan-only prefix, a plot similar to plot 800 shown in FIG. 8 is produced. This plot assumes a fixed total young generation size, divided between scan-only prefix and almost-empty regions. In this plot, the vertical axis represents the garbage collection efficiency ($GC_{eff}$) increasing in the upwards direction and the horizontal axis represents the number of regions in the scan-only prefix increasing towards the right. As shown, this plot 802 displays a maximum efficiency 804. The optimum size of the scan-only prefix is then selected as the corresponding number of regions on the horizontal axis.

Figure 9:
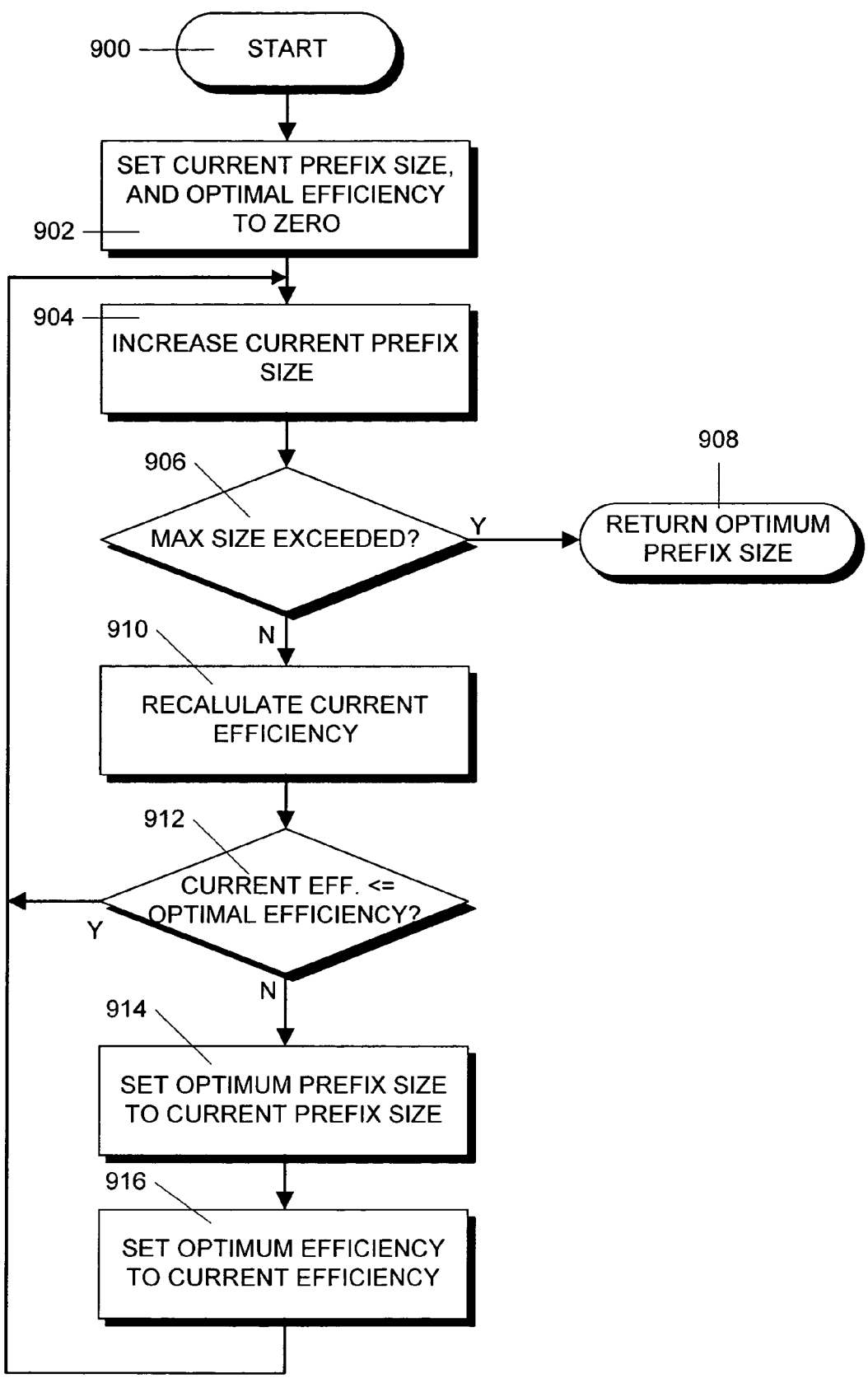
FIG. 9 is a flowchart showing the steps in an illustrative process for selecting the optimum size of the scan-only prefix part of the young generation.

This latter process is illustrated in FIG. 9 which begins in step 900 and proceeds to step 902, where a current scan-only prefix size variable and an optimal efficiency variable are set to zero. Then, in step 904, the current scan-only prefix size is increased by one region. In step 906, a determination is made whether the current scan-only prefix exceeds the maximum number of regions possible. This maximum number may be the number of regions in the young generation as determined by the garbage collector being used.

If the maximum size has not been exceeded, as determined in step 906, the current garbage collection efficiency ($GC_{eff}$) is re-calculated in step 910 as set forth above using the value of the current scan-only prefix size variable. Next, in step 912, the re-calculated current garbage collection efficiency is compared to the value of the optimal garbage collection efficiency variable. If the recalculated current garbage collection efficiency is less than, or equal to, the value of the optimal garbage collection variable, the process returns to step 904 where the current scan-only prefix size is increased by one region and the process is repeated.

Alternatively, if, in step 912, it is determined that the recalculated current efficiency is greater than the value of the optimal efficiency variable, the process proceeds to step 914 where the value of the optimum scan-only prefix size variable is set to the value of the current scan-only prefix size variable. In step 916, the value of the optimum garbage collection efficiency variable is set to the recalculated garbage collection efficiency. The process then returns to step 904 where the value of the current scan-only prefix size variable is increased by one. Operation continues in this fashion until the value of the current scan-only prefix size variable exceeds the maximum allowed size as determined in step 906. At this point the process proceeds to step 908 where the value of the optimum prefix size variable is returned. The process illustrated in FIG. 9 determines the optimal scan-only prefix size for a given young generation size. In other embodiments, a more extensive search can be performed in which all possible "configurations" are searched to find the optimal garbage collection efficiency. Each such configuration involves pairs of young generation sizes and scan-only prefix sizes. Additional constraints, such as the total collection cost and the fraction of available heap space reserved for allocating object copy space can also be introduced.

If the object survival rates cannot be dynamically calculated for some region, then it is not possible to calculate the garbage collection efficiency for that region in accordance with the process set forth above. In this case, the size of the scan-only prefix region can be set to some percentage (for example, 90%) of the optimum size in order to be able to monitor objects and detect changes in efficiency. Since what would have been the last regions in the scan-only prefix are included in the collected suffix, fresh survival rate measurements can be obtained for these regions, thereby allowing the detection of changes in program behavior that alter fine-grained allocation age at which survival rates transition from high to low values.

In practice, when the Garbage First garbage collector is used with programs for which a sharp survival rate dropoff exists, if the available pause time is large enough to allow the scan-only prefix to be scanned with some time left over, and the heap is sufficiently large to allow the young generation to be extended with enough almost-empty young regions, then the use of the scan-only prefix can result in a significant increase in garbage collector efficiency. For example, assume copying 1 MB of live objects takes 10 milliseconds, scanning a 1 MB scan-only prefix region takes 2 milliseconds, and the scan-only prefix region has a 50% survival rate, then a 50 MB scan-only prefix would have a copying cost of 250 milliseconds. Illustratively, if the maximum allowed pause time is 200 milliseconds, then the young generation would be limited to forty 1 MB regions, and using the conventional Garbage First garbage collector, 20 MB would be reclaimed in the 200 milliseconds, giving a reclamation rate of 100 MB/s.

However, if in accordance with the principles of the invention, a 50 MB scan-only prefix is used, this can be scanned in 100 milliseconds. If a sharp survival dropoff exists and the remaining almost-empty regions have 5% survival rates, copying objects out of one region in the almost-empty suffix would take 0.5 millisecond, so 200 regions in the almost-empty suffix can be evacuated in the remaining 100 milliseconds. Thus, 190 MB would be reclaimed in 200 milliseconds for a 9.5 times greater garbage collection efficiency.

Since the scan-only prefix is not collected, garbage in the scan-only prefix regions is retained at least until the next collection cycle. Thus, additional advantages can be obtained by manipulating the survival rate curve shown in FIG. 4. In particular, the greater the difference between the scan-only prefix object survival rate and the almost-empty object survival rate, the greater the advantage of the inventive technique. Therefore, it is advantageous to increase the "density" of live objects in scan-only prefix regions. Two additional embodiments involve techniques that discriminate between allocation instructions that produce very short-lived objects and those that produce longer-lived objects. In one additional embodiment, escape analysis is used. Escape analysis is a conventional static analysis technique for identifying allocation instructions that produce objects which can be proved to become unreachable before the method that performs the allocation completes. Conventional escape analysis is described in "Compositional Pointer and Escape Analysis for Java Programs", J. Whaley and M. Rinard, *ACM SIGPLAN Notices, Conference on Object-oriented Systems, Languages and Applications*", pp. 187-206, Denver, Colo. 1999 and "Escape Analysis for Java", J. Choi, M. Gupta, M. Serrano, V. C. Sreedhar and S. Midkiff, *ACM SIGPLAN Notices, Conference on Object-oriented Systems, Languages and Applications*", pp. 187-206, Denver, Colo. 1999. Such allocations may even be performed using an allocation stack. In another additional embodiment, pre-tenuring is used. Pre-tenuring is a conventional dynamic technique for identifying allocation instructions which produce objects that tend to survive young-generation collections. For example, the technique is described in "Dynamic Adaptive Pre-tenuring", T. L. Harris, *Proceedings of the International Symposium on Memory Management*, Minneapolis, Minn., Jan. 15-16, 2000.

In the additional embodiments, using either escape analysis or pre-tenuring, the short-lived and long-lived objects are allocated into separate regions. Regions containing short-lived objects would always be collected in a young-generation collection. The remaining long-lived regions would be divided into a scan-only prefix and an almost-empty suffix, as described above. This should make the scan-only prefix smaller and more densely packed with live objects.

A software implementation of the above-described embodiment may comprise a series of computer instructions fixed on a tangible medium, such as a computer readable media, for example, a diskette, a CD-ROM, a ROM memory, or a fixed disk. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices. It is contemplated that such a computer program product may be distributed as a removable media with accompanying printed or electronic documentation, e.g., shrink wrapped software, preloaded with a computer system, e.g., on system ROM or fixed disk.

Although an exemplary embodiment of the invention has been disclosed, it will be apparent to those skilled in the art that various changes and modifications can be made which will achieve some of the advantages of the invention without departing from the spirit and scope of the invention. The order of the process steps may also be changed without affecting the operation of the invention. Other aspects, such as the specific process flow, as well as other modifications to the inventive concept are intended to be covered by the appended claims.

What is claimed is:

1. A computer implemented method for performing garbage collection in a memory heap of a computer system, comprising:
    dividing the memory heap into a young generation and an old generation, wherein the young generation comprises a plurality of regions;
    counting a first number of bytes (NOB) evacuated from a first region during a first garbage collection cycle (GCC);
    counting a second NOB evacuated from a second region during the first GCC, wherein the plurality of regions includes the first region and the second region;
    calculating a first survival rate for the first region based on the first NOB, and a second survival rate for the second region based on the second NOB;
    dividing the plurality of regions, based on a predetermined survival rate boundary, into a prefix group and a suffix group, wherein the prefix group comprises the first region, wherein the suffix group comprises the second region, wherein the first survival rate and the second survival rate are on opposite sides of the predetermined survival rate boundary, and wherein the first survival rate exceeds the second survival rate;
    identifying a plurality of objects in the prefix group comprising pointers to a first plurality of objects in the suffix group;
    evacuating the first plurality of objects in the suffix group from the suffix group to an allocated space outside the suffix group in the memory heap;
    reclaiming memory in the suffix group for reuse by the computer system during a second GCC after evacuating the first plurality of objects in the suffix group, wherein memory in the prefix group is not reclaimed during the second GCC;
    calculating a plurality of garbage collection efficiencies for a plurality of prefix group sizes after reclaiming memory in the suffix group, wherein at least one of the plurality of garbage collection efficiencies is calculated by dividing a dividend comprising a size of an object of the first plurality of objects, by a divisor comprising a time for evacuating the object; and
    selecting a prefix group size from the plurality of prefix group sizes for a third GCC, wherein the prefix group size corresponds to a maximum garbage collection efficiency of the plurality of garbage collection efficiencies.

2. The computer implemented method of claim 1, wherein identifying the plurality of objects in the prefix group comprises:
    identifying a root object comprising a pointer to at least one of the plurality of objects in the prefix group.

3. The computer implemented method of claim 1, wherein counting the first NOB comprises:
    identifying an address of an object evacuated during the first GCC;
    removing a plurality of lower bits from the address to generate an offset;
    determining a location in the memory heap indexed by the offset, wherein the location is associated with the first region; and
    incrementing the first NOB by a size of the object in response to determining the location.

4. The computer implemented method of claim 1, further comprising:
    identifying a second plurality of objects in the suffix group, wherein the first plurality of objects in the suffix group comprise pointers to the second plurality of objects in the suffix group; and
    evacuating the second plurality of objects in the suffix group from the suffix group to the allocated space prior to reclaiming memory in the suffix group.

5. A system for performing garbage collection comprising:
    a processor; and
    a memory operatively connected to the processor and storing instructions that perform garbage collection in a memory heap by:
        dividing a memory heap of the memory into a young generation and an old generation, wherein the young generation comprises a plurality of regions;
        counting a first number of bytes (NOB) evacuated from a first region during a first garbage collection cycle (GCC);
        counting a second NOB evacuated from a second region during the first GCC, wherein the plurality of regions includes the first region and the second region;
        calculating a first survival rate for the first region based on the first NOB, and a second survival rate for the second region based on the second NOB;
        dividing the plurality of regions, based on a predetermined survival rate boundary, into a prefix group and a suffix group, wherein the prefix group comprises the first region, wherein the suffix group comprises the second region, wherein the first survival rate and the second survival rate are on opposite sides of the predetermined survival rate boundary, and wherein the first survival rate exceeds the second survival rate;
        identifying a plurality of objects in the prefix group comprising pointers to a first plurality of objects in the suffix group;
        evacuating the first plurality of objects in the suffix group from the suffix group to an allocated space outside the suffix group in the memory heap;
        reclaiming memory in the suffix group for reuse by the computer system during a second GCC after evacuating the first plurality of objects in the suffix group, wherein memory in the prefix group is not reclaimed during the second GCC;

calculating a plurality of garbage collection efficiencies for a plurality of prefix group sizes after reclaiming memory in the suffix group, wherein at least one of the plurality of garbage collection efficiencies is calculated by dividing a dividend comprising a size of an object of the first plurality of objects, by a divisor comprising a time for evacuating the object; and selecting a prefix group size from the plurality of prefix group sizes for a third GCC, wherein the prefix group size corresponds to a maximum garbage collection efficiency of the plurality of garbage collection efficiencies.

6. The system of claim 5, wherein the instructions to identify the plurality of objects in the prefix group comprises:

identifying a root object comprising a pointer to at least one of the plurality of objects in the prefix group.

7. The system of claim 5, wherein the instructions to count the first NOB comprises:

identifying an address of an object evacuated during the first GCC;

removing a plurality of lower bits from the address to generate an offset;

determining a location in the memory heap indexed by the offset, wherein the location is associated with the first region; and incrementing the first NOB by a size of the object in response to determining the location.

8. The system of claim 5, the instructions further comprising:

Identifying a second plurality of objects in the suffix group, wherein the first plurality of objects in the suffix group comprise pointers to the second plurality of objects in the suffix group; and evacuating the second plurality of objects in the suffix group from the suffix group to the allocated space prior to reclaiming memory in the suffix group.

9. A computer readable medium storing instructions that perform garbage collection in a memory heap by:

dividing the memory heap into a young generation and an old generation, wherein the young generation comprises a plurality of regions;

counting a first number of bytes (NOB) evacuated from a first region during a first garbage collection cycle (GCC);

counting a second NOB evacuated from a second region during the first GCC, wherein the plurality of regions includes the first region and the second region;

calculating a first survival rate for the first region based on the first NOB, and a second survival rate for the second region based on the second NOB;

dividing the plurality of regions, based on a predetermined survival rate boundary, into a prefix group and a suffix group, wherein the prefix group comprises the first region, wherein the suffix group comprises the second region, wherein the first survival rate and the second survival rate are on opposite sides of the predetermined survival rate boundary, and wherein the first survival rate exceeds the second survival rate;

identifying a plurality of objects in the prefix group comprising pointers to a first plurality of objects in the suffix group;

evacuating the first plurality of objects in the suffix group from the suffix group to an allocated space outside the suffix group in the memory heap;

reclaiming memory in the suffix group for reuse by the computer system during a second GCC after evacuating the first plurality of objects in the suffix group, wherein memory in the prefix group is not reclaimed during the second GCC;

calculating a plurality of garbage collection efficiencies for a plurality of prefix group sizes after reclaiming memory in the suffix group, wherein at least one of the plurality of garbage collection efficiencies is calculated by dividing a dividend comprising a size of an object of the first plurality of objects, by a divisor comprising a time for evacuating the object; and selecting a prefix group size from the plurality of prefix group sizes for a third GCC, wherein the prefix group size corresponds to a maximum garbage collection efficiency of the plurality of garbage collection efficiencies.

10. The computer readable medium of claim 9, wherein the instructions to identify the plurality of objects in the prefix group comprises:

identifying a root object comprising a pointer to at least one of the plurality of objects in the prefix group.

11. The computer readable medium of claim 9, wherein the instructions to count the first NOB comprises:

identifying an address of an object evacuated during the first GCC;

removing a plurality of lower bits from the address to generate an offset;

determining a location in the memory heap indexed by the offset, wherein the location is associated with the first region; and incrementing the first NOB by a size of the object in response to determining the location.

12. The computer readable medium of claim 9, the instructions further comprising:

identifying a second plurality of objects in the suffix group, wherein the first plurality of objects in the suffix group comprise pointers to the second plurality of objects in the suffix group; and evacuating the second plurality of objects in the suffix group from the suffix group to the allocated space prior to reclaiming memory in the suffix group.

* * * * *

UNITED STATES PATENT AND TRADEMARK OFFICE
CERTIFICATE OF CORRECTION

PATENT NO. : 7,599,973 B2  Page 1 of 1
APPLICATION NO. : 11/331376
DATED : October 6, 2009
INVENTOR(S) : Detlefs et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 621 days.

Signed and Sealed this

Twenty-eighth Day of September, 2010

David J. Kappos
*Director of the United States Patent and Trademark Office*